United States Patent [19]

Hayashi et al.

[11] Patent Number: 4,952,029
[45] Date of Patent: Aug. 28, 1990

[54] TWO CELLED LIQUID CRYSTAL DISPLAY DEVICE WITH DEPENDENCY OF BIREFRINGENCE ON WAVELENGTH LARGER IN FIRST CELL

[75] Inventors: Mariko Hayashi, Osaka; Naofumi Kimura; Yukiko Ichimura, both of Nara, all of Japan

[73] Assignee: Sharp Kabushiki Kaisha, Osaka, Japan

[21] Appl. No.: 278,727

[22] Filed: Dec. 2, 1988

[30] Foreign Application Priority Data

Dec. 3, 1987 [JP] Japan ............................. 62-306184

[51] Int. Cl.⁵ ............................................ G02F 1/133
[52] U.S. Cl. .................................. 350/335; 350/347 E; 350/347 R
[58] Field of Search ............... 350/335, 347 E, 347 R

[56] References Cited

U.S. PATENT DOCUMENTS

| | | | |
|---|---|---|---|
| 4,436,379 | 3/1984 | Funada et al. | 350/347 E |
| 4,466,702 | 8/1984 | Wiener-Avnear et al. | 350/347 R |
| 4,579,425 | 4/1986 | Ishii et al. | 350/341 |
| 4,601,546 | 7/1986 | Ohta | 350/339 F |
| 4,634,229 | 1/1987 | Amstutz et al. | 350/341 |
| 4,653,865 | 3/1987 | Kando et al. | 350/347 E |

FOREIGN PATENT DOCUMENTS 8203468 10/1982 PCT Int'l Appl.
2092769 8/1982 United Kingdom.

Primary Examiner—Stanley D. Miller
Assistant Examiner—Anita Pellman Gross

[57] ABSTRACT

There is provided a liquid crystal display device which includes: a double-layered-type liquid crystal cell. The cell is composed of a first cell layer and a second cell layer. The liquid crystal cell contains liquid crystal molecules with a twisted nematic orientation therein. Further, a voltage applying device is in the first cell layer. The dependency of the birefringence on the wavelength of light of the first cell layer is larger than that of the second cell layer. Accordingly, the liquid crystal display device produces a distinct and clear color image, and is useful for full-color display and multicolor display.

6 Claims, 5 Drawing Sheets

Fig. 1
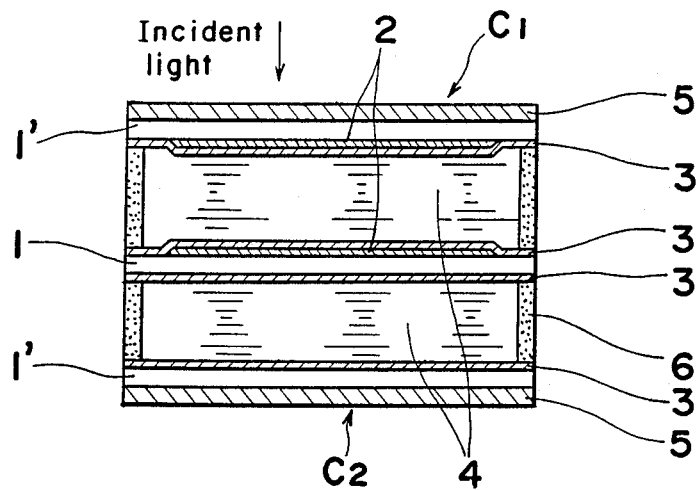
Fig. 2a                    Fig. 2b
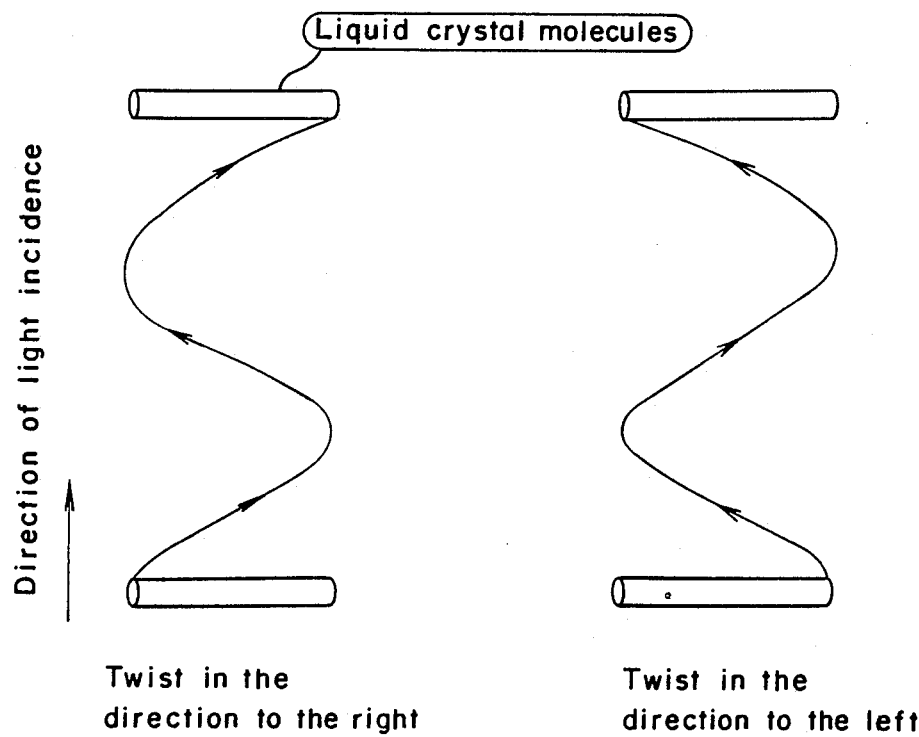
Twist in the
direction to the right
Twist in the
direction to the left

○ EX-02
● ZLI-3021-000

△ SP4024
● ZLI-3021-000

TWO CELLED LIQUID CRYSTAL DISPLAY DEVICE WITH DEPENDENCY OF BIREFRINGENCE ON WAVELENGTH LARGER IN FIRST CELL

BACKGROUND OF THE INVENTION

1. Field of the Invention

This invention relates to a multi-layered-type liquid crystal display device with the use of a twisted nematic display process that can attain an excellent color display.

2. Description of Prior Art

Liquid crystal display devices are now being used in clocks and electronic calculating machines, in displays of computers terminal and word processor, in televisions, and in a variety of other uses in many fields. Recently, there has been an extremely large demand for liquid crystal display devices because of the changes to multicolor and full-color displays, which are already being made use of in the fields of graphic display and image display. Color display, that has been widely put into practical use, is attained by a liquid crystal cell with color filter layers. The liquid crystal cell functions as a light-switcher, and produces various colors. The main kind of display mode is a twisted nematic display mode attained by a liquid crystal cell in which the liquid crystal is twisted at 90°. (The "twisted nematic" is referred to hereinafter as "TN".) However, when the TN display device is driven at a high duty ratio, the contrast of the image decreases. On the other hand, a supertwisted birefringence effect (which is referred to hereinafter as "SBE") process has been suggested, which produces TN oriented liquid crystal which is twisted at angles of approximately 180° to 270° larger than 90°. With the SBE process, the curve in the vicinity of the threshold value increases steeply, and even when the duty ratio increases, it is possible to obtain a high contrast ratio. However, because birefringence effects of liquid crystals are used, the dependence of the display characteristics on the wavelength of light is theoretically higher than with the TN display in which the liquid crystal is twisted at 90°. Thus, it is very difficult to adapt it for use in a full-color display.

SUMMARY OF THE INVENTION

An object of the present invention is to provide a liquid crystal display device which produces a colored display image with superior color reproducibility and high contrast ratio even when the liquid crystal display device is driven at a high duty ratio.

According to the present invention, there is provided a liquid crystal display device which includes a double-layered-type liquid crystal cell composed of a first cell layer and a second cell layer. The liquid crystal cell contains liquid crystal molecules with a twisted nematic orientation therein. Further, a voltage applying device is contained in the first cell layer. The twist angle of the liquid crystal in one first cell layer is opposite to that of the liquid crystal in the second cell layer. The orientation of the liquid crystal molecules in the first cell layer adjacent to the second cell layer is orthogonal to that of the liquid crystal molecules in the second cell layer adjacent to the first cell layer, and the dependency of the birefringence on the wavelength of light of the first cell layer is larger than that of said second cell layer.

The liquid crystal display device according to the present invention, with the use of the TN liquid crystal layer in which the liquid crystal is twisted at 90° or at an angle equal to or larger than 180°, produces a distinct and clear color image. Therefore, it is useful for full-color display and multicolor display.

BRIEF DESCRIPTION OF THE DRAWINGS

This invention may be better understood and its numerous objects and advantages will become apparent to those skilled in the art by reference to the accompanying drawings as follows:

FIG. 1 is a sectional view showing the fundamental cell structure of a double-layered-type liquid crystal display device of the preferred embodiment according to the present invention, FIGS. 2a and 2b are diagrams showing the twists of liquid crystal molecules in the right and left directions, respectively.

DETAILED DESCRIPTION OF THE PREFERRED EMBODIMENTS

Figure 3:
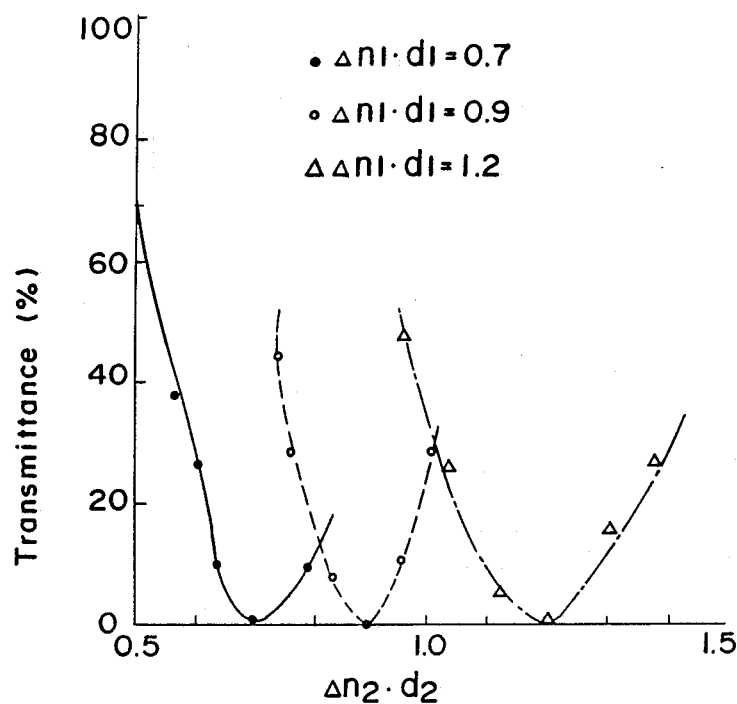
FIG. 3 is a graph of characteristic curves showing the relationship between the $\Delta n_2 \cdot d_2$ of the second cell and the transmittance when a polarizer is of a crossed-Nicols type with regard to the liquid crystal display device of the preferred embodiment according to the present invention.

FIG. 1 shows the fundamental structure of the double-layered-type liquid crystal display device of a preferred embodiment according to the present invention.

As shown in FIG. 1, the liquid crystal display device has a double layered structure composed of a first and a second cell layers $C_1$ and $C_2$, each of which contains a liquid crystal layer 4 therein. In the liquid crystal layer 4, liquid crystal molecules are arranged in a twisted nematic phase. The first and second cell layers $C_1$ and $C_2$ are form stacked on both surfaces of a common transparent substrate 1. Each cell layer has such a structure that the liquid crystal layer 4 is contained between two transparent substrates 1 and 1' and is sealed by a sealing element 6. The orientation membranes 3 for orienting liquid crystal molecules in a twisted nematic phase are formed on respective inner surfaces of the substrates 1 and 1'. The first cell layer $C_1$ has transparent electrode films 2 for applying a voltage to the liquid crystal layer which are formed on respective inner surfaces of the substrates 1 and 1'. Further, each cell layer has a polarizer 5 formed on the outer surface of each of the outer substrate 1'. Each of the transparent substances 1 and 1' may be made of glass, acrylic resin, or a similar material. The transparent conductive film 2 may be made of ITO (which is a film mainly made of indium oxide), a nesa film, or a similar material. Finally, the orientation film 3 may be made of an inorganic material such as $SiO_2$, SiO, or a similar material, or an organic material such as polyimide, polyvinyl alcohol, nylon, acrylic resin, or a similar material.

In the cell structure shown in FIG. 1, axes of respective liquid crystal molecules in the liquid crystal layer 4 are twisted helically from the side of one substrate to the side of another substrate of each cell layer, as shown schematically in FIGS. 2a or 2b. As is well known to those skilled in the art, the direction of twist is defined either that to the right (FIG. 2a) or that to the left (FIG. 2b) when seen in the direction of incident light. In order to give a twisting power to individual liquid crystal molecules, at least one optically active material is added in the nematic liquid crystal. In the case of the right twist, the material represented by the following general formula and offered by MERCK & Co., Inc. is added thereinto.

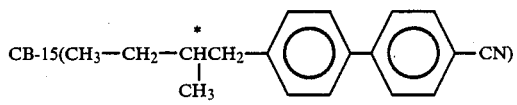

In the case of the left twist, cholesteryl nonanoate S-811 ® offered by the same company is added thereinto.

Values $\theta_1$ and $\theta_2$ of twist angles of the first and second liquid crystal layers 4 and 4 in the first and second cell layers, and values $\Delta n_1 \cdot d_1$ and $\Delta n_2 \cdot d_2$ of each, dictated by a product of the birefringence $\Delta n$ of the liquid crystal layer and the thickness d thereof, are adjusted so as to satisfy the following four requirements.

(1) FIG. 3 shows the relationship between the values of $\Delta n_1 \cdot d_1$ and $\Delta n_2 \cdot d_2$ and the transmittance, under conditions that both of $\theta_1$ and $\theta_2$ being set equal to 90°, respectively, with the polarizers 5 are of a crossed-Nicols type. Moreover, a voltage is not applied to the first cell layer $C_1$. FIG. 3 indicates that when the value of $\Delta n_2 \cdot d_2$ of the second cell layer $C_2$ is equal to that of $\Delta n_1 \cdot d_1$ of the first cell layer $C_1$, the transmittance becomes the lowest. Therefore, a high contrast ratio can be obtained. This phenomenon arises because the light dispersion in the first cell layer $C_1$ is compensated by the second cell layer $C_2$. The aforementioned results can be obtained not only when the twist angles $\theta_1$ and $\theta_2$ are set to be 90°, but also when they are set to be any degree, as long as both of them are set equal to each other. Moreover, the same results as mentioned above can be obtained, even if the specific pitch of the twist of the liquid crystal molecules in the first cell layer $C_1$ is different from that of the twist of the liquid crystal molecules in the second cell layer $C_2$, as long as the twisted structure of each liquid crystal layer has a desired twist angle with respect to the liquid crystal molecules contained therein. That is, the second cell layer $C_2$ functions as a compensation cell layer (a compensator) for the first cell layer $C_1$. This is the first requirement upon setting those values.

Figure 4:
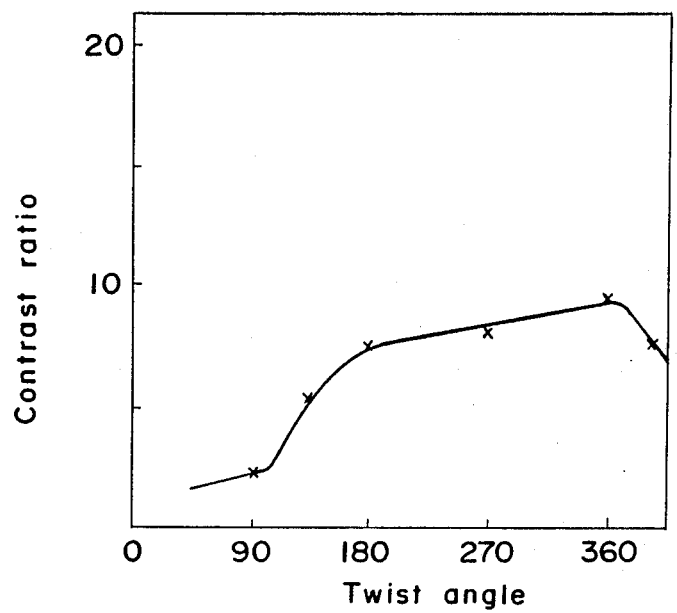
FIG. 4 is a graph of a characteristic curve showing the relationship between the twist angle of liquid crystal and the contrast ratio of display images.

In addition, taking the display contrast and visibility into consideration, the relationship between which is shown in FIG. 4, the twist angle of the liquid crystal is preferably set so as to fall in the range of about 180° to about 360°, wherein the contrast ratio becomes relatively high. If the twist angle of the liquid crystal exceeds 360°, a domain appears in which each liquid crystal has its orientation disarrayed at the time of the application of voltage, resulting in a dispersion of light. This readily causes a decrease in the contrast.

(2) To obtain a sharp steep threshold characteristic in the contrast, the specific helical pitch p of liquid crystal is considered to be very important. The ratio of the thickness d of the liquid crystal layer 4 to the pitch p of the helical twist of the liquid crystal, d/p, is preferably set so as to satisfy the following relation which is confirmed in the experiment performed by the inventors of the present invention:

$$\theta/2\pi - \tfrac{1}{4} < d/p \lesssim \theta/2\pi$$

wherein $\theta$ is the twist angle of the liquid crystal. This is the second requirement. This requirement can be applied only to the case where the pretilt angle of the liquid crystal is about 10° or less. In the case that the pretilt angle of the liquid crystals is larger than 10°, the range to be satisfied by the ratio d/p becomes different from the aforementioned range. The aforementioned requirement is available to a normally closed displaying system in which the liquid crystal becomes white when a voltage is applied thereto.

Figure 5:
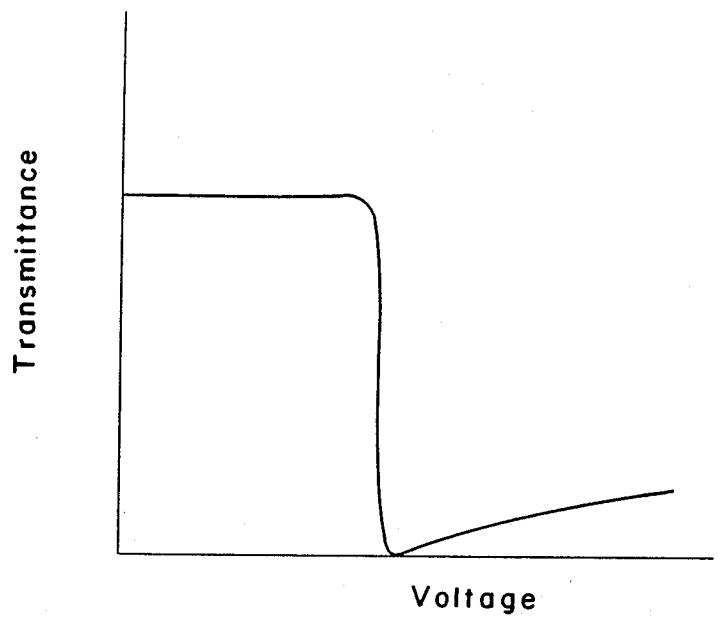
FIG. 5 is a graph of a characteristic curve showing the relationship between the applied voltage and the transmittance with regard to a double-layered-type SBE liquid crystal device.

(3) The third requirement is also available to a normally white display system. For example, when the values $\Delta n_1 \cdot d_1$ and $\Delta n_2 \cdot d_2$ in the first and second liquid crystal layers $C_1$ and $C_2$ are set at 0.7 and 0.5, respectively, and when the twist angle of each of the first and second cell layers $C_1$ and $C_2$ is 270°, the transmittance of light is about 70% at the time of the application of zero voltage. The transmittance drastically decreases, as shown in FIG. 5, with the application of voltage to the first cell layer $C_1$. This is because the application of voltage causes axes of liquid crystal molecules in the first cell layer $C_1$ to be risen upward in the direction of thickness. This apparently contributes to make the value of $\Delta n_1 \cdot d_1$ of the liquid crystal layer 4 in the first cell layer $C_1$ smaller, so that the value $\Delta n_1 \cdot d_1$ becomes equal to $\Delta n_2 \cdot d_2$ of the liquid crystal layer 4 in the second cell layer $C_2$. To attain such a phenomenon, the value of $\Delta n_2 \cdot d_2$ must be smaller than that of $\Delta n_1 \cdot d_1$. If the value $\Delta n_2 \cdot d_2$ becomes too close to the value $\Delta n_1 \cdot d_1$, the transmittance at the time of the application of zero voltage becomes extremely low, as is shown clearly in FIG. 3. According to the experiential consideration, it is confirmed that the value $\Delta n_2 \cdot d_2$ should satisfy the following inequality:

$$\Delta n_2 \cdot d_2 \leq 0.85 \Delta n_1 \cdot d_1.$$

Moreover, it is confirmed experientially that the requirements for the desired twist angle of the liquid crystal and the desired ratio of d/p thereof should be roughly the same as those in the case of the normally closed display system.

(4) The fourth requirement is used for making the dependency, of the display characteristics, on the wavelength of light, small. To satisfy the fourth requirement, the liquid crystal in the first cell layer $C_1$ is set so that the dependency of the birefringence $\Delta n_1$ thereof, on the wavelength of light, is larger than that of the liquid crystal in the second cell layer $C_2$. Moreover, by considering the speed of response, the thickness of the liquid crystal layer 4 is preferably set equal to or less than about 10 μm or less in the case where $180° \leq \theta \leq 360°$.

EXAMPLE 1

Figure 6:
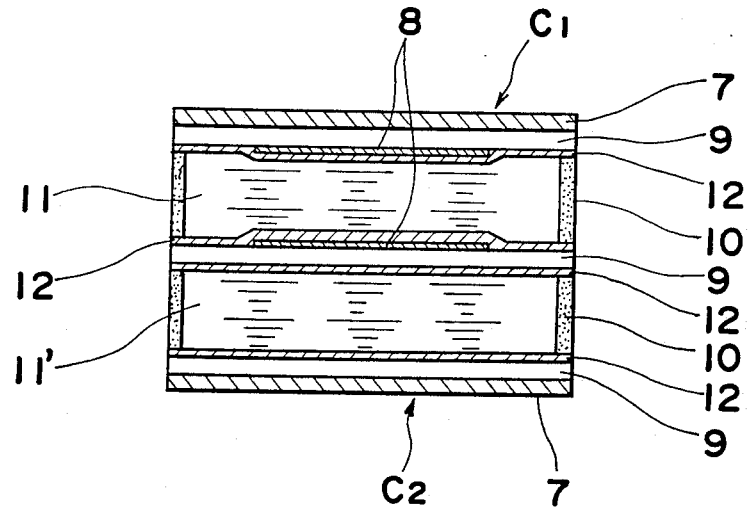
FIG. 6 is a sectional view showing the fundamental cell structure of a double-layered-type SBE liquid crystal display device of the preferred embodiment according to the present invention.

FIG. 6 shows the double-layered-type cell structure of a liquid crystal display device of the preferred embodiment according to the present invention. The twist angle of the liquid crystal in each of the first and second cell layers $C_1$ and $C_2$ is 240° (i.e., the device is an SBE liquid crystal device). A transparent conductive film 8 for applying a display driving voltage to a liquid crystal layer 11 is formed on each of the glass substrates 9 of the first cell layer $C_1$ alone by vapor deposition of ITO. On each of the transparent conductive films 8, a liquid crystal molecule orientation film 12 of polyimide is formed with a thickness of about 500 Å by a spin coating technique, the surface of which is treated by rubbing with cloth, causing the liquid crystal molecules to be in a parallel orientation. The periphery of each of the first and second cell layers $C_1$ and $C_2$ is sealed by a sealing element 10.

Figure 7A:
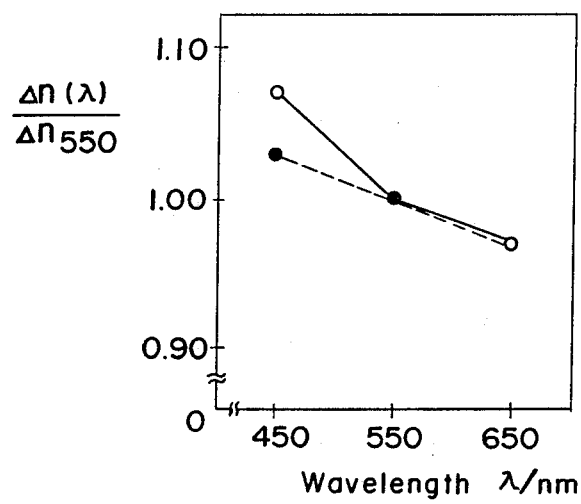
FIGS. 7a and 7b are graphs of characteristic curves showing the dependency of the birefringence $\Delta n$ on the wavelength of light of the liquid crystals used in the liquid crystal device shown in FIG. 6.
Figure 8B:
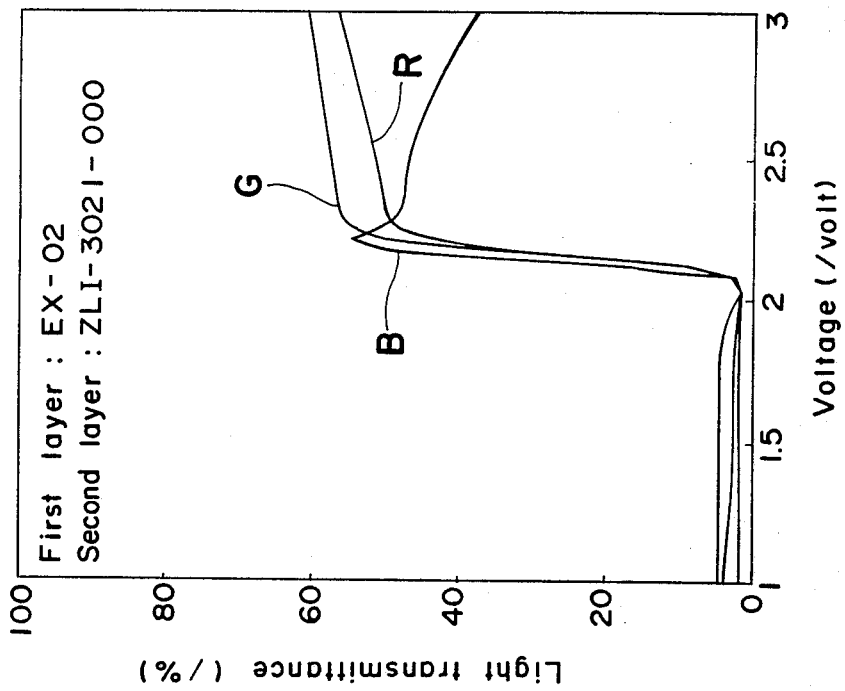
FIG. 8b is a graph of characteristic curves showing the relationship between the applied voltage and the light transmittance with regard to a double-layered-type liquid crystal cell comprising the liquid crystal EX-02 disposed in the first cell layer and the liquid crystal ZLI-3021-000 disposed in the second cell layer.
Figure 8A:
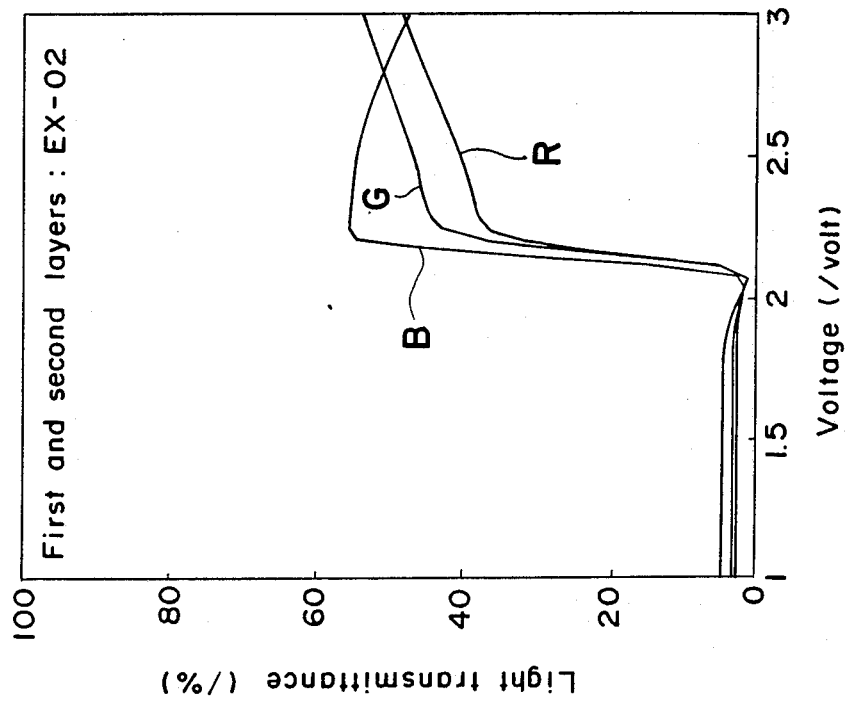
FIG. 8a is a graph of characteristic curves showing the relationship between the applied voltage and the light transmittance with regard to a double-layered-type liquid crystal cell comprising the liquid crystals EX-02 disposed in the first and second cell layers.

FIG. 7a shows respective dependencies of the birefringence $\Delta n$ on the wavelength of light of a nematic liquid crystal EX-02 made by Dainippon ink & chemicals, Inc. and a nematic liquid crystal ZLI-3021-000 (trade name) made by Merck & Co., Inc. These are used in the preferred embodiment. As shown in FIG. 7a, it is seen that the dependence of the birefringence $\Delta n$ on the wavelength of light of the nematic liquid crystal EX-02 is larger than that of the nematic liquid crystal ZLI-3021-000. Therefore, the nematic liquid crystal EX-02, to which 0.8 wt % of an optically active material S-811 is added, is used in the liquid crystal layer 11 of the first cell layer $C_1$. Further, the nematic liquid crystal ZLI-3021-000, to which 1.2 wt % of CB-15 is added, is used in the liquid crystal layer 11' of the second cell layer $C_2$. The pitch of the liquid crystal layer 11 in the first cell layer $C_1$ is about 10 μm and the pitch of the liquid crystal layer 11' in the second cell layer $C_2$ is about 15 μm. The twist angle of the liquid crystal in the first cell layer $C_1$ is opposite to that of liquid crystal in the second cell layer $C_2$. The thickness of the liquid crystal layer 11 in the first cell layer $C_1$ is about 6 μm and that of the liquid crystal layer 11' in the second cell layer $C_2$ is about 9 μm. A crossed-Nicols type the polarizer is used for each of polarizers 7. FIG. 8b shows the dependence of the light transmittance on the applied voltage with regard to the double-layered-type TN (twisted nematic) liquid crystal device of the present example. It includes the liquid crystal layer 11 of the nematic liquid crystal EX-02 and the liquid crystal layer 11' of the nematic liquid crystal ZLI-3021-000. FIG. 8a shows the dependence of the light transmittance on the applied voltage with regard to the double-layered-type TN liquid crystal device of a comparative example. It includes the liquid crystal layers 11 and 11' of the nematic liquid crystal EX-02. The wherein the wavelengths λ used herein for red color, green color, and blue color are 610 nm, 550 nm, and 450 nm, respectively. As shown in FIG. 8b, since the characteristic curves for red color, green color and blue color of the TN liquid crystal device of the present example show substantially uniform characteristics at in the range from the threshold voltage to a higher voltage, the TN liquid crystal device of the present example is useful for a color display with high contrast.

EXAMPLE 2

Figure 7B:
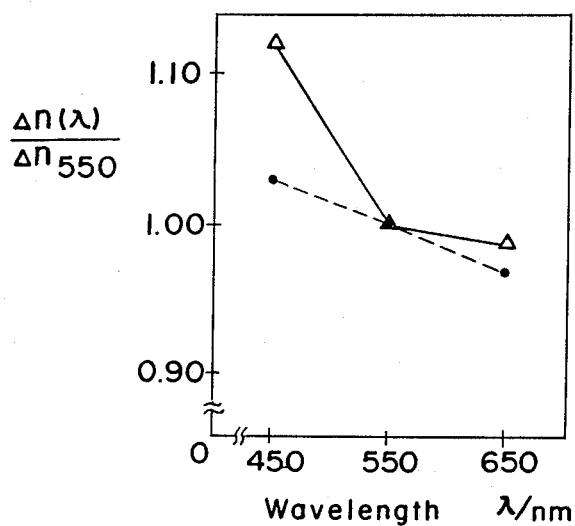

An experiment with regard to a double-layered-type TN liquid crystal device, including the liquid crystal layer 11 of a nematic liquid crystal SP4024 made by Chisso and the liquid crystal layer 11' of the nematic liquid crystal ZLI-3021-000, was made as well as the experiment of the Example. The dependence of the birefringence $\Delta n$ on the wavelength of light of the nematic liquid crystal SP4024 is larger than that of the nematic liquid crystal ZLI-3021-000, as shown in FIG. 7b. It is seen from the result of the experiment of the Example 2 that the TN liquid crystal device used in the Example 2 has the same effect as that of the TN liquid crystal device of the preferred embodiment used in the Example 1.

In the aforementioned examples, color filter layers of red, green and blue are disposed inside of the liquid crystal cell layer with a voltage applying device of each of the TN liquid crystal display devices. The liquid crystal display devices with the color filter layers are subjected to a duty drive, with the formation of a distinct, clear color image. These liquid crystal display devices are useful for full-color display and multicolor display.

It is understood that various other modifications will be apparent to and can be readily made by those skilled in the art without departing from the scope and spirit of the present invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art to which the present invention pertains.

What is claimed is:
1. A liquid crystal display device comprising:
 a double-layered-type liquid crystal cell which is composed of a first cell layer and a second cell layer, said liquid crystal cell containing liquid crystal molecules with a twisted nematic orientation therein; and
 voltage applying means for applying voltage to said first cell layer;
 wherein the twist angle of the liquid crystal in said first cell layer is opposite to that of the liquid crystal in said second cell layer, the orientation of the liquid crystal molecules in said first cell layer in the vicinity of said second cell layer is orthogonal to that of the liquid crystal molecules in said second cell layer in the vicinity of said first cell layer, and the dependency of the birefringence on the wavelength of light of said first cell layer is larger than that of said second cell layer such that when voltage is applied to said first cell layer, the dependency of the birefringence of the first cell layer is lowered to become approximately equal to that of the second cell layer.

2. The liquid crystal display device as claimed in claim 1, wherein the twist angles of the liquid crystal molecules in the first and second cell layers are approximately equal to each other, and the products $\Delta n \cdot d$ of the birefringence $\Delta n$ and the thickness d of the liquid crystal layers in each of the first and second cell layers are nearly equal to each other.

3. The liquid crystal display device as claimed in claim 1, wherein the twist angles of the liquid crystal molecules in the first and second cell layers are approximately equal to each other, and the product $\Delta n_1 \cdot d_1$ of the birefringence $\Delta n_1$ and the thickness $d_1$ of the liquid crystal layer in one of the first and second cell layers that undergoes an optical change due to the application of an external force, and the product $\Delta n_2 \cdot d_2$ of the birefringence $\Delta n_2$ and the thickness $d_2$ of the liquid crystal layer in the other cell layer that does not undergo an optical changes are represented by the following inequality:

$$\Delta n_2 \cdot d_2 \leq 0.85 \Delta n_1 \cdot d_1.$$

4. The liquid crystal display device as claimed in claim 1, wherein the relationship between the pitch p of twist of the liquid crystal molecules in the cell layer that has the voltage applying means therein and the thickness d of the liquid crystal layer in the said cell layer is as follows:

$$\theta/2\pi - \tfrac{1}{4} < d/p \lesssim \Gamma/2\pi$$

wherein 0 is the twist angle of the liquid crystal.

5. The liquid crystal display device as defined in any one of claims 1, 2, 3 and 4, wherein a color filter layer is disposed in at least one of the first and second cell layers.

6. The liquid crystal display device as claimed in any one of claims 1, 2, 3 and 4, wherein the twist angle of the liquid crystal in each of the first and second cell layers is in the range of 180° to 360°.

* * * * *